(12) United States Patent
Taylor et al.

(10) Patent No.: US 8,349,068 B2
(45) Date of Patent: *Jan. 8, 2013

(54) RAPID CURING WATER RESISTANT COMPOSITION FOR GROUTS, FILLERS AND THICK COATINGS

(75) Inventors: Steven L. Taylor, Glendora, CA (US); Zosimo D. Pamaran, La Mirada, CA (US)

(73) Assignee: Custom Building Products, Inc., Seal Beach, CA (US)

( * ) Notice: Subject to any disclaimer, the term of this patent is extended or adjusted under 35 U.S.C. 154(b) by 478 days.

This patent is subject to a terminal disclaimer.

(21) Appl. No.: 12/695,517

(22) Filed: Jan. 28, 2010

(65) Prior Publication Data

US 2011/0179743 A1  Jul. 28, 2011

(51) Int. Cl.
*C08L 33/00* (2006.01)

(52) U.S. Cl. ........ 106/482; 524/386; 524/493; 525/100; 525/477; 526/319; 526/328; 526/328.5; 526/329.2

(58) Field of Classification Search .................. None
See application file for complete search history.

(56) References Cited

U.S. PATENT DOCUMENTS

| | | | |
|---|---|---|---|
| 3,705,669 A | 12/1972 | Cox et al. | |
| 3,706,696 A | 12/1972 | Bernett et al. | |
| 3,854,267 A | 12/1974 | Weiant et al. | |
| 3,859,233 A | 1/1975 | Barker | |
| 3,940,358 A | 2/1976 | Bernett et al. | |
| 4,055,529 A | 10/1977 | Burley | |
| 4,230,356 A | 10/1980 | O'Connor | |
| 4,381,066 A | 4/1983 | Page et al. | |
| 4,415,099 A | 11/1983 | Paris | |
| 4,472,540 A | 9/1984 | Barker | |
| 4,517,375 A | 5/1985 | Schmidt | |
| 4,519,174 A | 5/1985 | Witt | |
| 4,648,904 A | 3/1987 | DePasquale et al. | |
| 4,758,295 A | 7/1988 | Sawaide et al. | |
| 4,833,178 A | 5/1989 | Schaefer et al. | |
| 4,849,618 A * | 7/1989 | Namikawa et al. | 235/493 |
| 4,948,018 A | 8/1990 | Tansley et al. | |
| 5,011,713 A | 4/1991 | Lenti et al. | |
| 5,216,057 A | 6/1993 | Pratt et al. | |
| 5,274,159 A | 12/1993 | Pellerite et al. | |
| 5,505,344 A | 4/1996 | Woods | |
| RE36,042 E | 1/1999 | Landy et al. | |
| 5,866,641 A | 2/1999 | Ronden et al. | |
| 6,037,429 A | 3/2000 | Linert et al. | |
| 6,251,984 B1 | 6/2001 | Shimada et al. | |
| 6,271,289 B1 | 8/2001 | Longoria et al. | |
| 6,284,077 B1 | 9/2001 | Lucas et al. | |
| 6,291,536 B1 | 9/2001 | Taylor | |
| 6,309,493 B1 | 10/2001 | Braun et al. | |
| 6,333,365 B1 | 12/2001 | Lucas et al. | |
| 6,395,794 B2 | 5/2002 | Lucas et al. | |
| 6,414,044 B2 | 7/2002 | Taylor | |
| 6,464,770 B1 | 10/2002 | Palm et al. | |
| 6,478,561 B2 | 11/2002 | Braun et al. | |
| 6,545,068 B1 | 4/2003 | Simmons et al. | |
| 6,569,939 B2 * | 5/2003 | Eck et al. | 524/588 |
| 6,596,074 B2 | 7/2003 | Pomeroy | |
| 7,005,462 B2 | 2/2006 | Schad et al. | |
| 7,241,828 B2 | 7/2007 | Kyte et al. | |
| 2002/0195025 A1 | 12/2002 | Bacher et al. | |
| 2003/0029132 A1 | 2/2003 | Ward | |
| 2003/0129419 A1 | 7/2003 | Chen | |
| 2005/0065240 A1 | 3/2005 | Kyte et al. | |
| 2005/0065256 A1 | 3/2005 | Kyte et al. | |
| 2005/0197437 A1 | 9/2005 | Kyte et al. | |
| 2007/0172658 A1 * | 7/2007 | Deruelle et al. | 428/405 |

FOREIGN PATENT DOCUMENTS

| | | |
|---|---|---|
| EP | 1403226 A1 * | 3/2004 |
| WO | 2005056489 A1 | 6/2005 |
| WO | 2006036778 A2 | 4/2006 |

OTHER PUBLICATIONS

Product data sheet for Rhoximat DS 931.*
Product data sheet for Wacker BS 45.*
Machine translation into English of EP 1 403 226 (no date).*
BASF Corporation, "Acronale® NX 4787 X: Aqueous Co-Polymer Dispersion for the Manufacture of Ceramic Tile Adhesives, Primers and Other Construction Adhesives", Technical Information Brochure XP-002631874, Oct. 2003, BASF Corporation, Charlotte, NC.
ISA/EPO, International Search Report for PCT International Application No. PCT/US2010/062228 dated Apr. 20, 2011.

* cited by examiner

*Primary Examiner* — Marc Zimmer
(74) *Attorney, Agent, or Firm* — Fulwider Patton LLP

(57) ABSTRACT

A premixed composition is formed from modified polyacrylate polymer, silicone emulsion, and silane, that cures rapidly to form a composition that can be used as a grout or coating. The premixed composition includes a latex resin including an acrylic-based polymer, a silicone emulsion, and a silane, and optionally may include various fillers, pigments, and adjuvants. These components in the proper proportions form a stable viscous suspension that can be floated into tile joints, and cleaned from an adjacent tile surface. The composition rapidly cures to form a hard mass that is resistant to abrasion, in both dry and wet conditions, is color consistent, and is resistant to staining.

22 Claims, 1 Drawing Sheet

RAPID CURING WATER RESISTANT COMPOSITION FOR GROUTS, FILLERS AND THICK COATINGS

BACKGROUND OF THE INVENTION

The present invention relates generally to compositions that can be used for grouting of tile and the like, and as fillers and thick coatings for use with other types of building materials, and more particularly relates to rapid curing premixed compositions containing a rapid curing acrylic-based polymer, a silicone emulsion, and a silane, that can be used as grout, filler or thick coating.

Tile installation commonly involves grouting of the tile with a water-based cementitious grout typically prepared by mixing a cementitious powder with water immediately prior to application of the grout. Mixing of the cementitious powder with water is typically messy, and the success of the grouting application is highly dependent upon using the correct proportions of cementitious powder and water, and the proper amount of mixing and "slaking" time. Furthermore, obtaining acceptable color uniformity with cementitious grouts is commonly a major challenge, since cementitious grouts are prone to efflorescence, typically a buildup of a visible, white powdery substance at the surface of grout joints, and since the final cured color of a grout is sensitive to absorption by tile and substrates, as well as environmental and weather conditions. Additionally, cementitious grouts commonly have poor stain resistance, and must be treated with topical sealers to resist staining.

Premixed grouts are typically more convenient to use than cementitious grouts, since they come ready to use and do not need to be mixed with water or other components prior to use. Premixed grouts are especially beneficial for color consistency and stain resistance. However, conventional premixed grouts do not harden as fast as cementitious grouts, and often require many days to cure properly.

One known tile grout composition is a water-based epoxy grout composition that employs a water dispersible epoxy polymer and a water compatible polyamine epoxy resin adduct as a curing agent in combination with a water repellent component. Another known grout composition includes naturally rounded colored quartz particles and a water-borne polyurethane. Another known polymer composition for flexibilizing building materials includes a water-insoluble, film-forming polymer of one or more ethylenically unsaturated monomers capable of free radical polymerization, a water-soluble polymer of one or more ethylenically unsaturated monomers capable of free radical polymerization, along with ionic and nonionic emulsifiers, and a mixture of at least two organosilicon compounds.

A fast hardening aqueous coating composition and paint is also known, including about 95-99 percent by weight of an anionically stabilized aqueous emulsion of a copolymer having a Tg of from about 0° C. to about 40° C., about 0.2 to about 5 percent by weight of a polyimine; and about 0.2 to about 5 percent by weight of a volatile base. Also known are aqueous silicone dispersions that are crosslinkable into an elastomeric state on removal of water, for the production of elastomeric silicone seals. A shelf-stable fast-cure aqueous coating is also known that contains an anionically stabilized latex, a polyfunctional amine and a volatile base in an amount sufficient to deprotonate the conjugate acid of the amine.

Moisture resistance is a key performance attribute of tile grouts, such that they can be used in showers, tub surrounds, kitchens and other areas with intermittent or continual wetness. There remains a need for rapid curing compositions that attain sufficient ultimate hardness and moisture resistance for use in grouting of tile and the like, and as fillers and thick coatings for use with other types of building materials. It is therefore desirable to provide compositions that can be used for grouting of tile and the like, and as fillers and thick coatings for use with other types of building materials, that cures rapidly and attains an improved ultimate hardness and moisture resistance. The present invention meets these and other needs.

SUMMARY OF THE INVENTION

Briefly, and in general terms, the present invention provides for a premixed composition formed from modified polyacrylate polymer, silicone emulsion, and silane that, when acting together, cure rapidly to form a composition that can be used as a grout or coating that rapidly attains an ultimate desired hardness. In addition, the composition attains improved moisture resistance.

Accordingly, the present invention provides for a premixed composition including a latex resin including an acrylic-based polymer, a silicone emulsion, and a silane, and optionally may include various fillers, pigments, and adjuvants. These components in the proper proportions forms a stable viscous suspension that can be floated into tile joints, and cleaned from an adjacent tile surface. The composition rapidly cures to form a hard mass that is resistant to abrasion, in both dry and wet conditions, is color consistent, and is resistant to staining. In one presently preferred aspect, the composition has a Shore D hardness of at least 20 after a one-day dry cure, and Shore D hardness of at least 18 after being subjected to immersion in water for one day following a one-day dry cure. In another presently preferred aspect, the composition has a Shore D hardness of at least 40 after a three-day dry cure, and Shore D hardness of at least 35 after being subjected to immersion in water for one day following a three-day dry cure. In another presently preferred aspect, the composition has a Shore D hardness of at least 60 after a seven-day dry cure, and a Shore D hardness of at least 50 after being subjected to immersion in water for one day following a seven-day dry cure.

In a presently preferred aspect, the composition includes approximately 15-25 percent by weight of a latex resin such as a fast cure latex resin having a glass transition temperature (Tg) above 25° C., approximately 1.5-3.5 percent by weight of a silicone emulsion, approximately 0.15 to 0.25 percent by weight of a silane, approximately 0.8 to 1.0 percent by weight ethylene glycol, and approximately 72 to 80 percent by weight sand, or more preferably approximately 74 to 77 percent by weight sand. The optimum sand amount may be determined by its packing density, which is mostly controlled by the gradation in size and shape of the sand. More preferably, the composition includes approximately 18-20 percent by weight of the latex resin, and approximately 2.0-2.8 percent by weight of the silicone emulsion.

In a presently preferred aspect, the latex resin component of the composition includes a polymer obtained by co-polymerization of styrene, alkyl(meth)acrylate and other copolymerizable monomers, where the alkyl group of the acrylate monomer can be methyl, ethyl, propyl, butyl or higher alkyl groups. The latex of the present invention has superior drying characteristics which are well described in U.S. Pat. No. 6,376,574, incorporated by reference herein, and in which the hardening characteristics of different latexes are shown in Table 1. More preferably, the latex polymer includes a copolymer of styrene and butylacrylate, optionally with a minor amount of another copolymerizable monomer. In order to obtain a high Tg latex polymer with rapid curing and hardness characteristics, the styrene monomer is preferable. The styrene content may be in the range of zero to about 70 percent by weight of the latex resin polymer.

In another presently preferred aspect, the silicone emulsion can include approximately 30 to 60 percent by weight of a siloxane, such as polymethylethoxy siloxane, and approximately 1 to 5 percent by weight of an alkylalkoxy silane, such as octyl triethoxy silane, with a remainder of ethanol, for example, although other similar silicone emulsions can also be suitable.

In another presently preferred aspect, the silane can include alkylalkoxy silane, optionally with a fluoropolymer, or alternatively can include an alkylalkoxy silane optionally with hydroxyl polyglycolether, an organic solvent such as alkoxyethanol acetate and ethanol, for example, although other similar silicone emulsions can also be suitable.

These and other aspects and advantages of the invention will become apparent from the following detailed description, which illustrates by way of example the features of the invention.

DETAILED DESCRIPTION OF THE PREFERRED EMBODIMENTS

Figure 1:
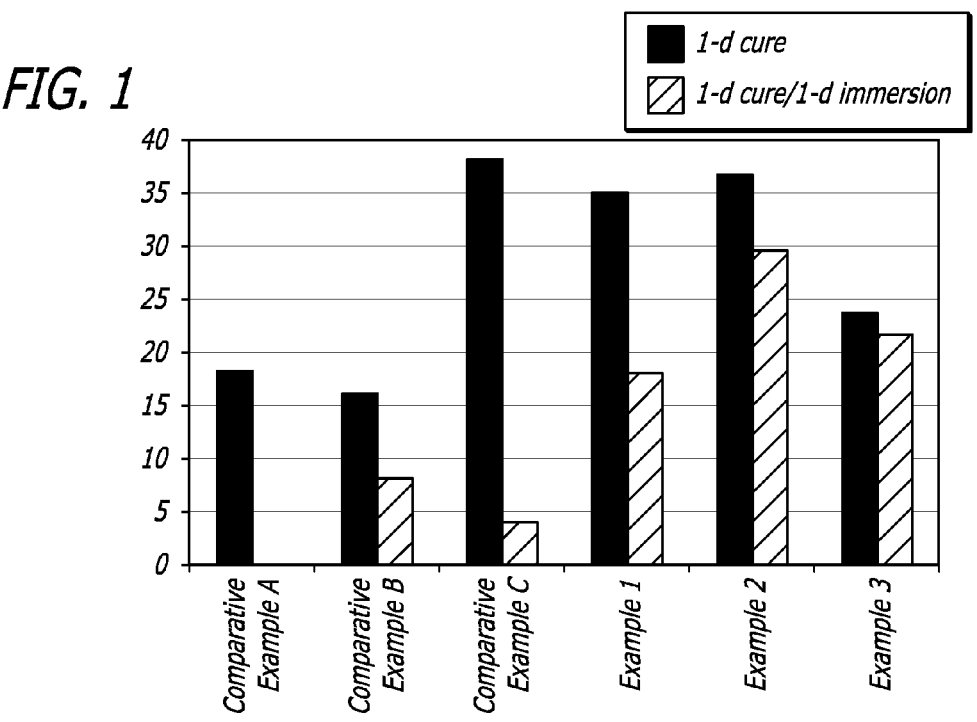
FIG. 1 is a bar graph depicting the Shore D hardness results of 1-day cure and 1-day immersion samples.
Figure 2:
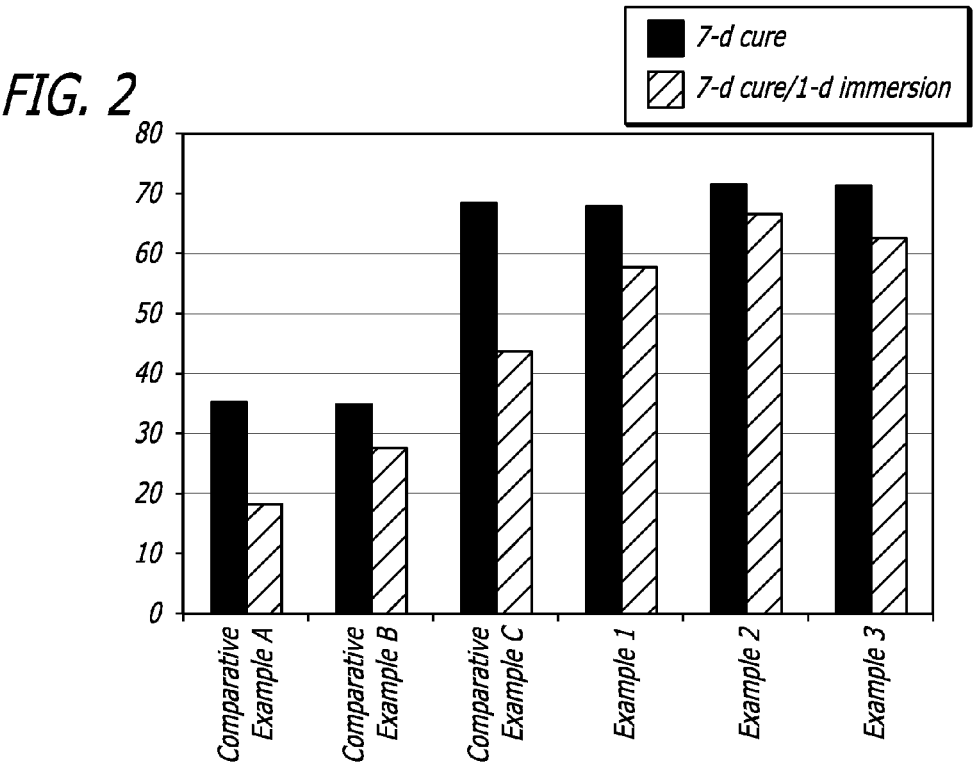
FIG. 2 is a bar graph depicting the Shore D hardness results of 7-day cure and 1-day immersion samples.

The premixed composition of the present invention advantageously includes a latex resin, a silicone emulsion, and a silane. The latex resin preferably has a glass transition temperature (Tg) above 25° C. The glass transition temperature can be measured by thermal method (e.g. DSC) or thermomechanical method (e.g. TMA), which is known in the prior art. The latex resin component of the composition preferably includes a polymer obtained by co-polymerization of styrene, alkyl(meth)acrylate and other copolymerizable monomers. More preferably, the latex polymer includes a copolymer of styrene and butylacrylate, optionally including a minor amount of another similar copolymerizable monomer, such as is well known in the art. In order to obtain high Tg latex polymer, styrene content may be in the range of zero to about 70 percent by weight of the polymer. The alkyl group of the acrylate monomer can be, methyl, ethyl, propyl, butyl or higher alkyl groups. The butyl group is the most commonly used in the fast curing latex composition. The latex content in the composition of the present invention is approximately 15 to 25 percent by weight as a latex, which is typically provided as approximately 40 to 60 solid percent by weight, where the filler content is typically approximately 76 to 85 percent by weight. More preferably, the latex resin content is approximately 18 to 20 percent by weight of the composition of the present invention. One such presently preferred latex resin is a latex resin commercially available under such brand names as HD-21A from Rohm & Haas, or DT-250 from Dow Chemical, containing approximately 45.0 to 55.0 percent by weight of acrylic polymer(s) or a styrene-acrylate based polymer.

The silicone emulsion can include approximately 30 to 60 percent by weight polymethylethoxy siloxane and approximately 1 to 5 percent by weight alkylalkoxy silane, for example, although other similar silicone emulsions can also be suitable. The presently preferred range of the silicone emulsion, which typically has 40-50 solid weight % content, is 1.5-3.5 percent by weight in the composition of the present invention, more preferably 2.0-2.8 percent by weight. Too much silicone emulsion may cause the curing delay, whereas insufficient amount of the emulsion limits the water resistance ability of the cured composition. One such presently preferred silicone emulsion is available under the brand name SILRES BS 45 from Wacker, containing an alkylsilicone resin emulsion in water, and more particularly containing approximately 30 to 60 percent by weight polymethylethoxysiloxane and approximately 1 to 5 percent by weight octyltriethoxy silane, with a trace amount of ethanol, for example, although other similar silicone emulsions can also be suitable.

The silane can include an alkylalkoxy silane water dispersion, optionally with a fluoropolymer; or alternatively, the silane can include alkylalkoxy silane optionally with hydroxy polyglycolether, alkoxyethanol acetate, with a remainder of an organic solvent, such as ethanol, for example, although other similar silanes can also be suitable. One such presently preferred silane is an alkylalkoxy silane with fluoropolymer dispersion in water available under the brand name SILRES BS 29A from Wacker.

The composition of the present invention also preferably contains approximately 72 to 80 percent by weight sand, or more preferably approximately 74 to 77 percent by weight sand, and can contain approximately 0.8 to 1.0 percent by weight ethylene glycol. The optimum amount of sand may be determined by the packing density of the sand, which is mostly controlled by the gradation in size and shape of the sand. The composition of the present invention may also optionally include other minor ingredients, such as a deodorant to mask any ammonia smell from the fast curing latex, as well as various fillers, pigments, thickeners, and adjuvants, such as, for example, approximately 0.2 percent by weight of a silicone defoamer; approximately 0.07 to 0.1 percent by weight of a surfactant, such as nonylphenol polyethoxylate; approximately 0.04 percent by weight of preservative and biocide; approximately 0.015 percent by weight of a rheology modifier and thickener, such as hydroxyethyl methyl cellulose; and approximately 0.5 to 0.6 percent by weight of an acrylic-based thickener, for example. Other similar fillers, pigments, thickeners, and adjuvants may also be suitable. The unexpected, surprising improvement of the compositions according to the invention is illustrated in the following detailed comparative examples presented for purposes of comparison, and examples of preferred embodiments according to the invention.

TABLE 1

COMPARATIVE EXAMPLES

|  | Example A (parts by weight) | Example B (parts by weight) | Example C (parts by weight) |
| --- | --- | --- | --- |
| Synthomer RAVACRYL 473 | 188 | 188 |  |
| Rohm & Haas HD-21A |  |  | 188 |
| Wacker SILRES BS 45 |  | 22 |  |
| Wacker SILRES BS 29A | 2.5 | 2.5 | 2.5 |
| Defoamer | 2.5 | 2.5 | 2 |
| Non-ionic surfactant | 2.7 | 2.7 | 1 |
| Ethylene glycol | 14 | 14 | 10 |
| Biocide and preservative | 0.43 | 0.43 | 0.43 |
| Water | 3.5 | 3.5 |  |

TABLE 1-continued

COMPARATIVE EXAMPLES

|  | Example A (parts by weight) | Example B (parts by weight) | Example C (parts by weight) |
|---|---|---|---|
| Cellulose ether thickener |  |  | 0.15 |
| #70 sand | 750 | 750 | 750 |
| Acrylic thickener | 1.2 | 3.5 | 7 |
| Total | 966.23 | 990.53 | 961.08 |

TABLE 2

RELATIVE SHORE D HARDNESS (DUROMETER - D)

| Cure Time (days) | Example A | Example B | Example C |
|---|---|---|---|
| 1 | 18 | 16 | 38 |
| 3 | 30 | 32 | 46 |
| 5 | 35 | 33 | 66 |
| 7 | 35 | 35 | 69 |
| 15 | 40 | 36 | 69 |
| 30 | 40 | 36 | 71 |

TABLE 3

RELATIVE SHORE D HARDNESS WITH WATER IMMERSION (DUROMETER - D)

|  | Example A | Example B | Example C |
|---|---|---|---|
| 1 Day Dry Cure | 18 | 16 | 38 |
| 1 Day Dry Cure/ 1 Day Water Immersion | 0 | 8 | 4 |
| 3 Day Dry Cure | 30 | 32 | 36 |
| 3 Day Dry Cure/ 1 Day Water Immersion | 8 | 22 | 30 |
| 7 Day Dry Cure | 36 | 35 | 69 |
| 7 Day Dry Cure/ 1 Day Water Immersion | 18 | 28 | 44 |

TABLE 4

STAIN RESISTANCE

| Staining Agents | Example A | Example B | Example C |
|---|---|---|---|
| Coffee | 1 | 1 | 1 |
| Coke | 0 | 0 | 0 |
| Red wine | 0 | 0 | 0 |
| Soy sauce | 0 | 0 | 0 |
| Ketchup | 0 | 0 | 0 |
| Mustard | 1 | 0 | 0 |
| Vegetable oil | 0 | 0 | 0 |
| Total score | 2 | 1 | 1 |

(Rating (0-4): 0-No stain; 1-Very light; 2-Light; 3-Medium; 4-Heavy)

TABLE 5

EXAMPLES OF PREFERRED EMBODIMENTS

|  | Example 1 (parts by weight) | Example 2 (parts by weight) | Example 3 (parts by weight) |
|---|---|---|---|
| Rohm & Haas HD-21A | 188 |  |  |
| Dow Chemical DT-250NA |  | 188 | 216 |
| Wacker SILRES BS 45 | 22 | 22 | 25.5 |
| Wacker SILRES BS 29A | 2 | 1.75 | 2.3 |
| Defoamer | 2 | 2 |  |
| Non-ionic surfactant | 1 | 1 | 0.75 |
| Ethylene glycol | 10 | 10 | 8 |
| Biocide and preservative | 0.43 | 0.43 | 0.43 |
| Cellulose ether thickener | 0.15 | 0.15 | 0.15 |
| #70 sand | 750 | 750 | 760 |
| Acrylic thickener | 6 | 5 | 6 |
| Total | 981.58 | 980.33 | 1019.13 |

TABLE 6

RELATIVE SHORE D HARDNESS (DUROMETER - D)

| Cure Time (days) | Example 1 | Example 2 | Example 3 |
|---|---|---|---|
| 1 | 35 | 37 | 24 |
| 3 | 48 | 52 | 50 |
| 5 | 65 | 68 | 68 |
| 7 | 68 | 72 | 72 |
| 15 | 68 | 75 | 72 |
| 40 | 70 | 76 | 73 |

TABLE 7

RELATIVE SHORE D HARDNESS WITH WATER IMMERSION (DUROMETER - D)

|  | Example 1 | Example 2 | Example 3 |
|---|---|---|---|
| 1 Day Dry Cure | 35 | 37 | 24 |
| 1 Day Dry Cure/ 1 Day Water Immersion | 18 | 30 | 22 |
| 3 Day Dry Cure | 48 | 52 | 50 |
| 3 Day Dry Cure/ 1 Day Water Immersion | 48 | 49 | 43 |
| 7 Day Dry Cure | 68 | 72 | 72 |
| 7 Day Dry Cure/ 1 Day Water Immersion | 59 | 67 | 64 |

TABLE 8

STAIN RESISTANCE

| Staining Agents | Example 1 | Example 2 | Example 3 |
|---|---|---|---|
| Coffee | 1 | 1 | 0 |
| Coke | 0 | 0 | 0 |
| Red wine | 0 | 0 | 0 |
| Soy sauce | 0 | 0 | 0 |
| Ketchup | 0 | 0 | 0 |
| Mustard | 0 | 0 | 0 |
| Vegetable oil | 0 | 0 | 0 |
| Total score | 1 | 1 | 0 |

(Rating (0-4): 0-No stain; 1-Very light; 2-Light; 3-Medium; 4-Heavy)

In the foregoing Comparative Examples A-C, and Examples 1-3, grout compositions were prepared by mixing the ingredients listed in Tables 1 and 5, and were tested by application of the grout compositions to tile installed on a backerboard by inserting the grout composition in spaces between the tiles according to standard techniques, and allowing the applied grout compositions to dry for different periods of time, and were tested for relative hardness on the Shore Durometer (D) scale, as indicated in Tables 2 and 6.

The samples were also tested for relative hardness for different periods of drying time and with and without immersion in water, as indicated in Tables 3 and 7. The samples were rated for stain resistance after 4 hours of stain dwell time, and after being brushed clean with water only, and allowed to dry. The samples were tested for stain resistance on a subjective relative scale of zero to 4, with the following ratings: 0—No stain; 1—Very light; 2—Light; 3—Medium; 4—Heavy.

It can be seen from the foregoing examples in Tables 2 and 6 that the compositions of Examples 1-3 according to the invention showed surprising improvement of hardness over the Comparative Examples A-C after drying and curing only, and from Tables 4 and 8 that the Compositions of Examples 1-3 according to the invention showed improved stain resistance over the Comparative Examples A-C. However, it can be seen from Tables 3 and 7 that the compositions of Examples 1-3 according to the invention unexpectedly showed a dramatic improvement of hardness over the Comparative Examples A-C, after drying and curing for one day, followed by immersion in water for a period of one day; after drying and curing for three days, followed by immersion in water for a period of one day; and after drying and curing for three days, followed by immersion in water for a period of one day. The properties of rapid curing and resistance to water are critically important for compositions and coatings that are subjected to exposure to water, such as by immersion, splashing or condensation, for example. The premixed composition of the present invention preferably has a Shore D hardness of at least 20 after a one-day dry cure, and a Shore D hardness of at least 18 after being subjected to immersion in water for one day following a one-day dry cure; a Shore D hardness of at least 40 after a three-day dry cure, and a Shore D hardness of at least 35 after being subjected to immersion in water for one day following a three-day dry cure; and a Shore D hardness of at least 60 after a seven-day dry cure, and a Shore D hardness of at least 50 after being subjected to immersion in water for one day following a seven-day dry cure.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A premixed composition suitable for use as a grout or coating, comprising:
   a latex resin having a glass transition temperature (Tg) above 25° C.;
   a silicone emulsion;
   a silane; and
   sand, wherein said composition has a Shore D hardness of at least 20 after a one-day dry cure, and Shore D hardness of at least 18 after being subjected to immersion in water for one day following a one-day dry cure.

2. The premixed composition of claim 1, wherein said latex resin comprises approximately 15-25 percent by weight of the total composition.

3. The premixed composition of claim 1, wherein said silicone emulsion comprises approximately 1.5-3.5 percent by weight of the total composition.

4. The premixed composition of claim 1, wherein said silane comprises approximately 0.15 to 0.25 percent by weight of the total composition.

5. A premixed composition suitable for use as a grout or coating, comprising:
   a latex resin having a glass transition temperature (Tg) above 25° C.;
   a silicone emulsion;
   a silane; and
   sand, wherein said sand comprises approximately 72 to 80 percent by weight of the total composition.

6. The premixed composition of claim 1, wherein said latex resin comprises a polymer obtained by polymerization of alkyl(meth)acrylate and optionally with other copolymerizable monomers, wherein the alkyl group of the acrylate monomer can be methyl, ethyl, propyl, butyl or higher alkyl groups.

7. A premixed composition suitable for use as a grout or coating, comprising:
   a latex resin having a glass transition temperature (Tg) above 25° C.;
   a silicone emulsion;
   a silane; and
   sand, wherein said latex resin comprises a copolymer of styrene and butylacrylate.

8. A premixed composition suitable for use as a grout or coating, comprising:
   a latex resin having a glass transition temperature (Tg) above 25° C.;
   a silicone emulsion;
   a silane; and
   sand, wherein said latex resin comprises a polymer obtained by polymerization of alkyl(meth)acrylate and optionally with other copolymerizable monomers, wherein the alkyl group of the acrylate monomer can be methyl, ethyl, propyl, butyl or higher alkyl groups, and wherein said polymer comprises about zero to about 70 percent by weight styrene.

9. A premixed composition suitable for use as a grout or coating, comprising:
   a latex resin having a glass transition temperature (Tg) above 25° C.;
   a silicone emulsion;
   a silane; and
   sand, wherein said silicone emulsion comprises approximately 30 to 60 percent by weight polymethylethoxy siloxane and approximately 1 to 5 percent by weight alkylalkoxy silane.

10. A premixed composition suitable for use as a grout or coating, comprising:
    a latex resin having a glass transition temperature (Tg) above 25° C.;
    a silicone emulsion;
    a silane; and
    sand, wherein said silane comprises an aqueous dispersion of alkylalkoxy silane, optionally with fluoropolymer.

11. A premixed composition suitable for use as a grout or coating, comprising:
    approximately 15-25 percent by weight of a latex resin having a glass transition temperature (Tg) above 25° C.;
    approximately 1.5-3.5 percent by weight of a silicone emulsion;
    approximately 0.15 to 0.25 percent by weight of a silane;
    approximately 0.8 to 1.0 percent by weight ethylene glycol; and
    approximately 72 to 80 percent by weight sand.

12. The premixed composition of claim 11, wherein said composition has a Shore D hardness of at least 20 after a one-day dry cure, and Shore D hardness of at least 18 after being subjected to immersion in water for one day following a one-day dry cure.

13. The premixed composition of claim 11, wherein said composition has a Shore D hardness of at least 40 after a three-day dry cure, and Shore D hardness of at least 35 after being subjected to immersion in water for one day following a three-day dry cure.

14. The premixed composition of claim 11, wherein said silicone emulsion comprises approximately 2.0-3.0 percent by weight of the total composition.

15. The premixed composition of claim 11, wherein said latex resin comprises a polymer obtained by polymerization of alkyl(meth)acrylate and optionally with other copolymerizable monomers, wherein the alkyl group of the acrylate monomer can be methyl, ethyl, propyl, butyl or higher alkyl groups.

16. The premixed composition of claim 11, wherein said latex resin comprises a copolymer of styrene and butylacrylate.

17. The premixed composition of claim 16, wherein said polymer comprises approximately zero to 70 percent by weight styrene.

18. The premixed composition of claim 11, wherein said silicone emulsion comprises approximately 30 to 60 percent by weight polymethylethoxy siloxane and approximately 1 to 5 percent by weight alkylalkoxy silane.

19. The premixed composition of claim 11, wherein said silane comprises an aqueous dispersion of alkylalkoxy silane, optionally with a fluoropolymer.

20. A method of grouting tile, comprising the steps of:
providing a premixed composition, comprising:
a) a latex resin having a glass transition temperature (Tg) above 25° C.,
b) a silicone emulsion,
c) a silane, and
d) sand;
applying the premixed composition in spaces between a plurality of tiles installed on a substrate surface; and
allowing the premixed composition to dry to cure, wherein said composition has a Shore D hardness of at least 20 after a one-day dry cure, Shore D hardness of at least 18 after being subjected to immersion in water for one day following a one-day dry cure, a Shore D hardness of at least 40 after a three-day dry cure, and Shore D hardness of at least 35 after being subjected to immersion in water for one day following a three-day dry cure.

21. A method of grouting tile, comprising the steps of:
providing a premixed composition, comprising:
a) a latex resin having a glass transition temperature (Tg) above 25° C.,
b) a silicone emulsion,
c) a silane, and
d) sand;
applying the premixed composition in spaces between a plurality of tiles installed on a substrate surface; and
the premixed composition to dry to cure, wherein said premixed composition comprises:
approximately 15-25 percent by weight of a latex resin having a glass transition temperature (Tg) above 25° C.;
approximately 1.5-3.5 percent by weight of a silicone emulsion;
approximately 0.15 to 0.25 percent by weight of a silane;
approximately 0.8 to 1.0 percent by weight ethylene glycol; and
approximately 74 to 77 percent by weight sand.

22. The method of claim 20, wherein said composition has a Shore D hardness of at least 60 after a seven-day dry cure, and a Shore D hardness of at least 50 after being subjected to immersion in water for one day following a seven-day dry cure.

* * * * *

UNITED STATES PATENT AND TRADEMARK OFFICE
CERTIFICATE OF CORRECTION

PATENT NO.          : 8,349,068 B2
APPLICATION NO.     : 12/695517
DATED               : January 8, 2013
INVENTOR(S)         : Steven L. Taylor et al.

It is certified that error appears in the above-identified patent and that said Letters Patent is hereby corrected as shown below:

In the Claims:

Column 10, line 18, before "the premixed" insert --allowing--.

Signed and Sealed this
Sixth Day of August, 2013

Teresa Stanek Rea
*Acting Director of the United States Patent and Trademark Office*